(12) United States Patent
Scharbak (10) Patent No.: US 12,179,731 B2
(45) Date of Patent: Dec. 31, 2024

(54) METHOD FOR DETERMINING A BRAKE PRESSURE CHANGE

(71) Applicant: Robert Bosch GmbH, Stuttgart (DE)

(72) Inventor: Rami Scharbak, Benningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 123 days.

(21) Appl. No.: 17/796,328

(22) PCT Filed: Mar. 17, 2021

(86) PCT No.: PCT/EP2021/056801
§ 371 (c)(1),
(2) Date: Jul. 29, 2022

(87) PCT Pub. No.: WO2021/244784
PCT Pub. Date: Dec. 9, 2021

(65) Prior Publication Data
US 2023/0077346 A1  Mar. 16, 2023

(30) Foreign Application Priority Data
Jun. 2, 2020 (DE) ..................... 10 2020 206 837.2

(51) Int. Cl.
  *B60T 8/171* (2006.01)
  *B60Q 9/00* (2006.01)
  (Continued)

(52) U.S. Cl.
  CPC ............... *B60T 8/171* (2013.01); *B60Q 9/00* (2013.01); *B60T 7/12* (2013.01); *B60T 8/172* (2013.01);
  (Continued)

(58) Field of Classification Search
  CPC ......... B60T 8/171; B60T 7/12; B60T 2270/88
  See application file for complete search history.

(56) References Cited

U.S. PATENT DOCUMENTS

2006/0131955 A1* 6/2006 Lee ..................... B60T 8/1755
  303/146
2009/0306872 A1* 12/2009 Joyce .................. B60T 8/17616
  701/76

(Continued)

OTHER PUBLICATIONS

International Search Report for PCT/EP2021/056801, Issued Jun. 16, 2021.

*Primary Examiner* — Long T Tran
(74) *Attorney, Agent, or Firm* — NORTON ROSE FULBRIGHT US LLP; Gerard A. Messina (57) ABSTRACT

A method for determining a brake pressure change for a wheel of a vehicle to optimize a braking operation. The method includes: supplying a current wheel status of the wheel, wherein the wheel status includes a plurality of status parameters; determining at least one status parameter whose value deviates from a target wheel status; determining a change direction of the brake pressure change depending on a deviation of the at least one status parameter from the target wheel status; supplying a brake pressure characteristic map for determining a value of the brake pressure change, wherein the brake pressure characteristic map associates a brake pressure change with the plurality of status parameters and is specific to the determined change direction of the brake pressure change and status parameter change; determining a value of the brake pressure change using the current wheel status and the supplied brake pressure characteristic map.

21 Claims, 9 Drawing Sheets

(51) Int. Cl.
  *B60T 7/12*    (2006.01)
  *B60T 8/172*   (2006.01)
  *B60T 8/174*   (2006.01)
  *B60T 17/22*   (2006.01)
  *G01P 15/00*   (2006.01)
  *B60T 8/1761*  (2006.01)

(52) U.S. Cl.
  CPC .............. *B60T 8/174* (2013.01); *B60T 17/22* (2013.01); *G01P 15/00* (2013.01); *B60T 8/17616* (2013.01); *B60T 2240/00* (2013.01); *B60T 2270/10* (2013.01); *B60T 2270/88* (2013.01)

(56) References Cited

U.S. PATENT DOCUMENTS

| | | | |
|---|---|---|---|
| 2012/0306261 A1* | 12/2012 | Leiber | B60T 13/745 303/146 |
| 2015/0183428 A1* | 7/2015 | Nishigaki | B60T 8/1755 701/41 |
| 2015/0224970 A1* | 8/2015 | Yasui | B60T 8/1761 701/74 |
| 2018/0029568 A1 | 2/2018 | Hoehn et al. | |
| 2020/0055511 A1* | 2/2020 | Schwagmeyer | B60T 7/12 |
| 2020/0130666 A1* | 4/2020 | Izumoto | B60T 8/42 |
| 2020/0172064 A1* | 6/2020 | Yasui | B60T 8/17616 |

* cited by examiner

METHOD FOR DETERMINING A BRAKE PRESSURE CHANGE

FIELD

The present invention relates to a method for determining a brake pressure change for a wheel of a vehicle in order to optimize a braking operation.

BACKGROUND INFORMATION

If a maximum coefficient of friction between a vehicle wheel and a roadway is exceeded, for example in the event of aquaplaning or wintry conditions such as heavy rain, snow, or ice, there is a risk of an unstable driving situation due to a loss of adhesion between the vehicle wheel and the roadway. For many driver-assistance systems and for partially automated vehicles, it is important not to exceed the maximum coefficient of friction in order to always ensure a safe driving status or, where applicable, terminate an automatic driving function.

Modern motor vehicles have controllers such as electronic stability program (ESP). The ESP substantially constitutes a slip control system. When critical driving situations arise, a safety system intervenes, for example the antilock braking system (ABS) or a traction control system (TCS).

These systems are based on antilock control (ALC), i.e., brake pressure control in which a brake pressure is increased, decreased, or maintained in order to counteract wheel locking and shorten the braking distance.

The latest ALCs have many parameters for allowing the application engineer to achieve the optimum performance for various vehicles. Finding the optimum values for these parameters is, however, very complex.

This is because the application engineer has to drive through different ALC maneuvers, trigger ALC with full braking, evaluate the measurement, and assess which parameters out of the many different parameters need adjusting in order to enhance the performance, and they have to repeat this process many times until they achieve the target performance.

SUMMARY

An object of the present invention is to simplify the search for parameters for adjusting an antilock controller. It is intended that a controller independently learns the best brake pressure change for keeping a wheel of a vehicle stable while simultaneously achieving the shortest possible braking distance.

According to aspects of the present invention, what are provided are a method for determining a brake pressure change for a wheel of a vehicle in order to optimize a braking operation, a method for determining a brake pressure characteristic map, uses of the method, an actuation method, a device, a computer program, and a machine-readable storage medium, which achieve the above-mentioned objects at least in part. Advantageous embodiments of the present invention are disclosure herein.

Throughout this description of the present invention, the sequence of method steps is described so that the method can be easily understood. However, a person skilled in the art will recognize that many of the method steps can also be run through in a different order and lead to the same or a similar result. With this in mind, the order of the method steps can be changed accordingly.

According to one aspect of the present invention, a method for determining a brake pressure change for a wheel of a vehicle in order to optimize a braking operation is provided. In accordance with an example embodiment of the present invention, the method includes the following steps:

In one step of the method, a current wheel status of the wheel is supplied, the wheel status including a plurality of status parameters. In a further step, at least one status parameter whose value deviates from a target wheel status is determined. In a further step, a change direction of the brake pressure change is determined depending on a deviation of the at least one status parameter from the target wheel status. In a further step, a brake pressure characteristic map for determining a value of the brake pressure change is supplied, the brake pressure characteristic map associating a brake pressure change with the plurality of status parameters and being specific to the determined change direction of the brake pressure change and status parameter change. In a further step, a value of the brake pressure change is determined using the current wheel status and the supplied brake pressure characteristic map.

In the process, the plurality of status parameters, for example a slip or an acceleration of the wheel, are determined by way of signals generated by sensors of the vehicle, for example inertia sensors or speed sensors. In other words, the wheel status can, for example, be a function of the slip and of the acceleration of the wheel:

$$\text{wheel status} = f(\text{slip}, a\text{Wheel})$$

The braking torque of a wheel can be varied by way of the brake pressure, it being possible to adjust a brake pressure by accumulating brake pressure changes. In this case, the brake pressure change can be a function of the wheel status.

In the context of a change direction of the brake pressure change being dependent on a deviation of the at least one status parameter from the target wheel status, the term "deviation" should be construed broadly and in particular covers both a quantitative deviation in the sense of a distance and a deviation that changes over time in the manner of a gradient.

As will be explained below, the brake pressure characteristic map can be optimized again and again using a reinforcement learning method by correcting values of the relevant brake pressure characteristic map when running through different wheel statuses. An application engineer can adjust these different wheel statuses for each vehicle in a corresponding driving mode, an agent of the reinforcement learning method accordingly learning the best actions in relation to a brake pressure change from reward rules (policy). These best actions can then be stored in a corresponding brake pressure characteristic map and made available in order to adjust a brake pressure change.

Advantageously, for this method for determining a brake pressure change, the result is thus an easy-to-implement method for searching for parameters to adjust an antilock controller.

In the process, the method for determining a brake pressure change is configured so simply that an application engineer can make manual changes to the control procedure, for example by changing the values in a brake pressure characteristic map.

A current wheel status can also be characterized by additional status parameters, as listed below.

The direction of the change in the brake pressure change, i.e., whether the brake pressure should be increased or decreased on the basis of the brake pressure change, can, for example, be determined by a mode decision module in such a way that a wheel status corresponding to a target wheel status is reached as quickly as possible or maintained.

In the process, a target wheel status of this kind can be established for each axle of the vehicle, and this target wheel status can be established depending on status parameters, for example a minimum and maximum slip and/or a minimum or maximum wheel acceleration, such as to optimize the performance of the braking system as a whole.

A target wheel status of this kind can also be established dynamically depending on the wheel status, bend radius, or ground condition.

To determine this change direction, one of the status parameters can be selected from the plurality of status parameters, for example. A selection of this kind can be based on pre-set rules. For example, the slip of the relevant wheel can be used for this purpose.

Typically, when the brake pressure rises, the slip of the wheel increases and the wheel is braked further, i.e., the wheel undergoes negative acceleration.

If the brake pressure drops, then typically the slip drops and the wheel is braked to a lesser extent, i.e., the wheel accelerates.

By way of example, in accordance with the present invention, four characteristic maps may be generated for this method, which differ on account of the relative change in the two status parameters, such as slip and wheel acceleration, i.e., an increase or decrease in the status parameter. In the event of a positive brake pressure change, i.e., a resultant increase in the brake pressure, the two characteristic maps related to the wheel acceleration can be used. Accordingly, in the event of a negative brake pressure change, the two characteristic maps related to the slip status parameter can be used. Before the reinforcement learning method used below is used, the corresponding characteristic maps can be computed using values from a simulation.

Each characteristic map can directly associate a brake pressure change according to the relevant status parameters, or indicate a factor for determining the brake pressure change by way of a calculation. In this case, the relevant status parameter can be multiplied by this factor when the status parameter in question is currently increasing, and can be divided by this factor when the status parameter in question is currently decreasing.

For a slip that is currently increasing, i.e., when a previous slip is lower than the current slip, the following thus applies:

$dp_{Target} = -K_{sIIn} * \text{slip value}$ and for a slip that is currently decreasing, the following applies:

$dp_{Target} = -K_{sIDe} / \text{slip value}$

The same applies to a wheel acceleration that is currently increasing:

$dp_{Target} = K_{aIn} * \text{wheel acceleration}$ and to a wheel acceleration that is currently decreasing:

$dp_{Target} = K_{aDe} / \text{wheel acceleration}$

In this case, the parameters $K_{sIIn}$ and $K_{sIDe}$ denote an increase and a decrease in the slip value, respectively, and $K_{aIn}$, and $K_{aDe}$ denote an increase and a decrease in the wheel acceleration, respectively, for each brake pressure change $dp_{Target}$.

Owing to this determination of each brake pressure change depending on the current change in the status parameters, the control implemented is thus more or less aggressive depending on the particular direction of the change in the status parameters.

In other words, no proportional control is carried out when a slip or wheel acceleration value is decreasing. By contrast, proportional control is carried out when the slip or wheel acceleration values are increasing.

Advantageously, the method can be used for vehicles that are equipped with antilock control. The method can be used for all the functions that use wheel controllers, such as in traction control. In the process, the target wheel status can be adjusted accordingly so as to perform the altered task of making the wheel faster than a vehicle reference speed, where applicable.

According to one aspect of the present invention, it is provided that at least one previous wheel status is supplied, and the brake pressure characteristic map is specific to the determined change direction of the brake pressure change and to a change in the at least one status parameter.

According to one aspect of the present invention, it is provided that at least one previous wheel status is supplied, and the at least one supplied brake pressure characteristic map is dependent on a change direction of the at least one status parameter whose value deviates from a target wheel status.

A target wheel status of this kind can be established in accordance with an extremely efficient braking system, having maximum and minimum values for each status parameter and for each axle, i.e., the front axle and rear axle of the vehicle. For example, a target wheel status of this kind can be defined by the following value ranges of the slip and wheel acceleration status parameters:

Slip_min=5%; Slip_max=10%; WheelAcceleration_min=−20 m/s2; WheelAcceleration_max=−15 m/s2.

Selecting a target wheel status dynamically can firm up a vehicle reference speed, when necessary, by selecting a Slip_max to be less than zero for one axle for a particular period of time. In other words, it is intended that the wheel attempts to become faster than the vehicle reference speed in order to check the plausibility of that speed and, if necessary, correct it.

In addition, when a vehicle is driving on sandy ground, it may be desirable to have a higher slip on the front axle, so the following values can be established, by way of example, for the target slip value: Slip_min=25%; Slip_max=35%.

According to one aspect of the present invention, it is provided that a gradient of the at least one status parameter is determined using at least the previous and the current value of the status parameter, and the determination of the change direction of the brake pressure change is additionally determined by way of the gradient.

Advantageously, the determined gradient allows a particular brake pressure change to be determined in such a way that a brake pressure is predictively adjusted in the timeliest manner possible in order to bring the wheel status to the target wheel status as quickly as possible and keep it there.

In the process, further previous status parameters can also be used to determine the gradient; in other words, a progression of at least one status parameter over time can be used to determine the gradient, and/or a plurality of status parameters, as listed below, can be used to determine the gradient.

This determination of the gradient makes it possible to account for a delay time when determining the direction of the brake pressure change; said delay time makes it essential to determine the brake pressure changes predictively since an impact of the brake pressure change does not take effect until later due to the delay time of, for example, 30 ms and a determination of the wheel status within a period of, for example, 5 ms.

According to one aspect of the present invention, it is provided that the determination of the change direction of the brake pressure change is determined by way of a multiplicity of status parameters.

Examples of such status parameters are a wheel slip and/or an acceleration of the wheel and/or a gradient of the slip and/or an acceleration of the wheel (aWheel) and/or a jerk of the wheel (jerk (wheel)) and/or a wheel acceleration relative to the acceleration of the vehicle (aWheel relative to aVehicle).

According to one aspect of the present invention, it is proposed that the determination of the change direction of the brake pressure change is determined depending on a delay time of an entire system for changing the brake pressure.

According to one aspect of the present invention, it is proposed that the at least one status parameter is determined from the multiplicity of status parameters in accordance with a prioritization order.

For example, the value of the slip status parameter can have a higher priority for establishing the determined status parameter that deviates from a target wheel status, since locking of the wheel is to be prevented and, for this purpose, the brake pressure can be reduced until such a point as the relevant wheel has a slip that is lower than aimed at with the target wheel status.

According to one aspect of the present invention, it is provided that the plurality of status parameters includes a wheel slip and/or an acceleration of the wheel and/or a gradient of the slip and/or an acceleration of the wheel and/or a jerk of the wheel and/or a wheel acceleration relative to the acceleration of the vehicle.

In accordance with the present invention, a method for determining a brake pressure characteristic map for the above-described method is provided. In accordance with an example embodiment of the present invention, the method includes the following steps:

In one step, a current wheel status is supplied, the wheel status including a plurality of status parameters. In a further step, reward rules for a reinforcement learning method are supplied. In a further step, a reward is determined using the reward rules and the current wheel status, and where a reward has been determined for the reinforcement learning method, a most recently completed pressure change is determined in terms of value and change direction and the associated brake pressure characteristic map, and also a correction value for the associated brake pressure characteristic map is determined in accordance with the reinforcement learning method.

A reward rule of this kind indicates which action, for example the brake pressure change, is to be executed from the environment for a given behavior variant or observation, such as the wheel status deviating from the target wheel status, in order to maximize the reward or minimize a punishment.

An agent implementing this reinforcement learning method can modify the pressure change defined by the brake pressure characteristic maps depending on the relevant status parameters until such a point as the slip status parameter, for example, is constantly below a predefined threshold. This modification can be made using an established percentage change or at random.

Advantageously, the method for determining a brake pressure characteristic map can be used to adjust the characteristic maps such that the optimum performance is achieved using a braking system controlled in this manner.

In the process, the reward rules are defined such that a target performance can be achieved.

If a reward is determined according to the reward rules, which can also include corresponding punishment rules, a modification is made to a brake pressure change or the corresponding parameter that has occurred in a particular wheel status resulting in the reward or punishment.

An agent of the reinforcement learning method modifies the parameter or the brake pressure change by way of a random or percentage change until the value of the brake pressure change allows no further reward to be determined from the corresponding brake pressure characteristic map for the wheel status in question. This means that the wheel status can then be within the target wheel status. For example, a slip status parameter can then always be within a maximum and a minimum value.

In addition, for example, pressure changes within a particular wheel status that lead to a high slip gradient can be punished using the reward rules.

Advantageously, in this method said agent implementing the reinforcement learning method takes care of the optimization of the control procedure in that it adjusts the relevant brake pressure characteristic maps and the application engineer specifies the environment, i.e., different wheel statuses, using a corresponding performance. This results in the desired simplification when adapting a braking control system to the vehicle in question.

According to one aspect of the present invention, it is provided that, in the method for determining a brake pressure characteristic map, at least one previous wheel status of the wheel is supplied and the reward is determined using the current and/or the at least one previous wheel status.

According to one aspect of the present invention, it is provided that the reward rules determine a reward depending on whether a slip value drops below a limit value for the slip and/or on whether a slip value drops below zero and/or on a modulation frequency of a pressure change.

According to another aspect of the present invention, use of the above-described method for determining a brake pressure change to control a brake pressure on a wheel is provided.

According to another aspect of the present invention, use of the method for determining a brake pressure characteristic map to optimize the performance of a brake pressure controller for a wheel of a vehicle is provided.

In accordance with an example embodiment of the present invention, a method is provided in which a control signal for actuating an at least partially automated vehicle is supplied on the basis of a determined brake pressure change, and/or a warning signal for alerting a vehicle occupant is supplied on the basis of the determined brake pressure change.

For example, a control unit of the vehicle can implement a traction control system (TCS) in which, by way of example, a wheel that is temporarily driving on icy ground is braked, or all the wheels are braked during a braking operation such that a braking distance is minimal under particular circumstances.

The expression "on the basis of" in relation to the feature whereby a control signal is supplied on the basis of a determined brake pressure change should be construed broadly. It should be taken to mean that the determined brake pressure change is used for any determination or calculation of a control signal, although this does not rule out the possibility of other input variables also being used for this determination of the control signal. The same applies accordingly to supplying the warning signal.

In accordance with an example embodiment of the present invention, a braking system configured to carry out one of the above-described methods for determining a brake pressure change is provided.

Using a device of this kind, the relevant method can be integrated in different systems in a simple manner.

According to a further aspect of the present invention, a computer program is disclosed that comprises commands which, when the computer program is executed by a computer, cause said computer to carry out one of the above-described methods. A computer program of this kind allows the described method to be used in different systems.

According to a further aspect of the present invention, a machine-readable storage medium is provided, on which the above-described computer program is stored.

The term "vehicle" used here can also be understood generally to be a mobile platform, which may be an at least partially automated mobile system and/or a driver-assistance system. One example may be an at least partially automated vehicle, or a vehicle comprising a driver-assistance system. In other words, in this context an at least partially automated system includes a mobile platform in relation to an at least partially automated functionality, but a mobile platform also includes vehicles and other mobile machines, including driver-assistance systems. Further examples of mobile platforms may be driver-assistance systems comprising a plurality of sensors, mobile multi-sensor robots, such as robot vacuum cleaners or lawnmowers, a multi-sensor monitoring system, a boat, an aircraft, a manufacturing machine, a personal assistant, or an access control system. Each of these systems may be a fully or partially autonomous system.

BRIEF DESCRIPTION OF THE DRAWINGS

Exemplary embodiments of the present invention are illustrated with reference to FIGS. 1 to 9 and explained in more detail below.

DETAILED DESCRIPTION OF EXAMPLE EMBODIMENTS

Figure 1:
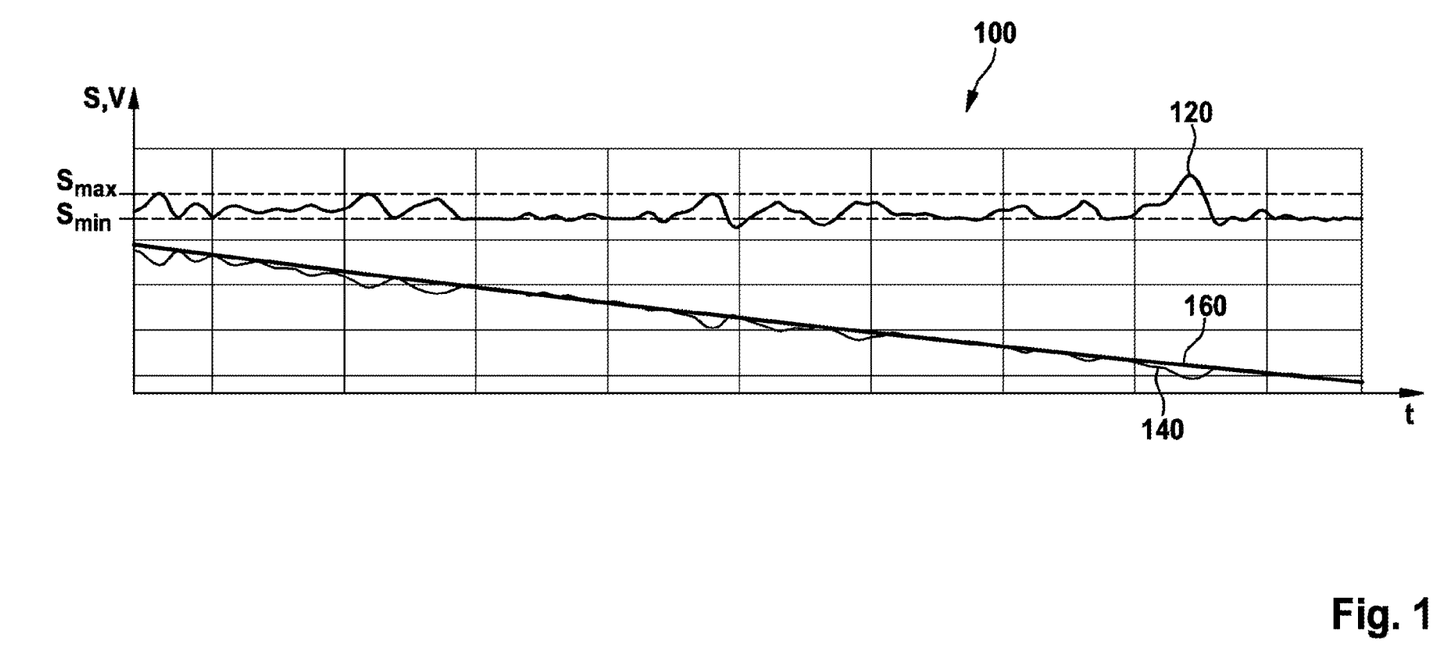
FIG. 1 shows a curve of a slip value and the corresponding wheel speed over time.

By way of example, FIG. 1 is a graph 100 showing a curve of a slip value 120 over time, along with limits $S_{max}$, $S_{min}$ within which the slip value should be located. In this case, the curve 160 shows a reference speed v and the curve 140 shows the speed of the wheel being observed.

Figure 2:
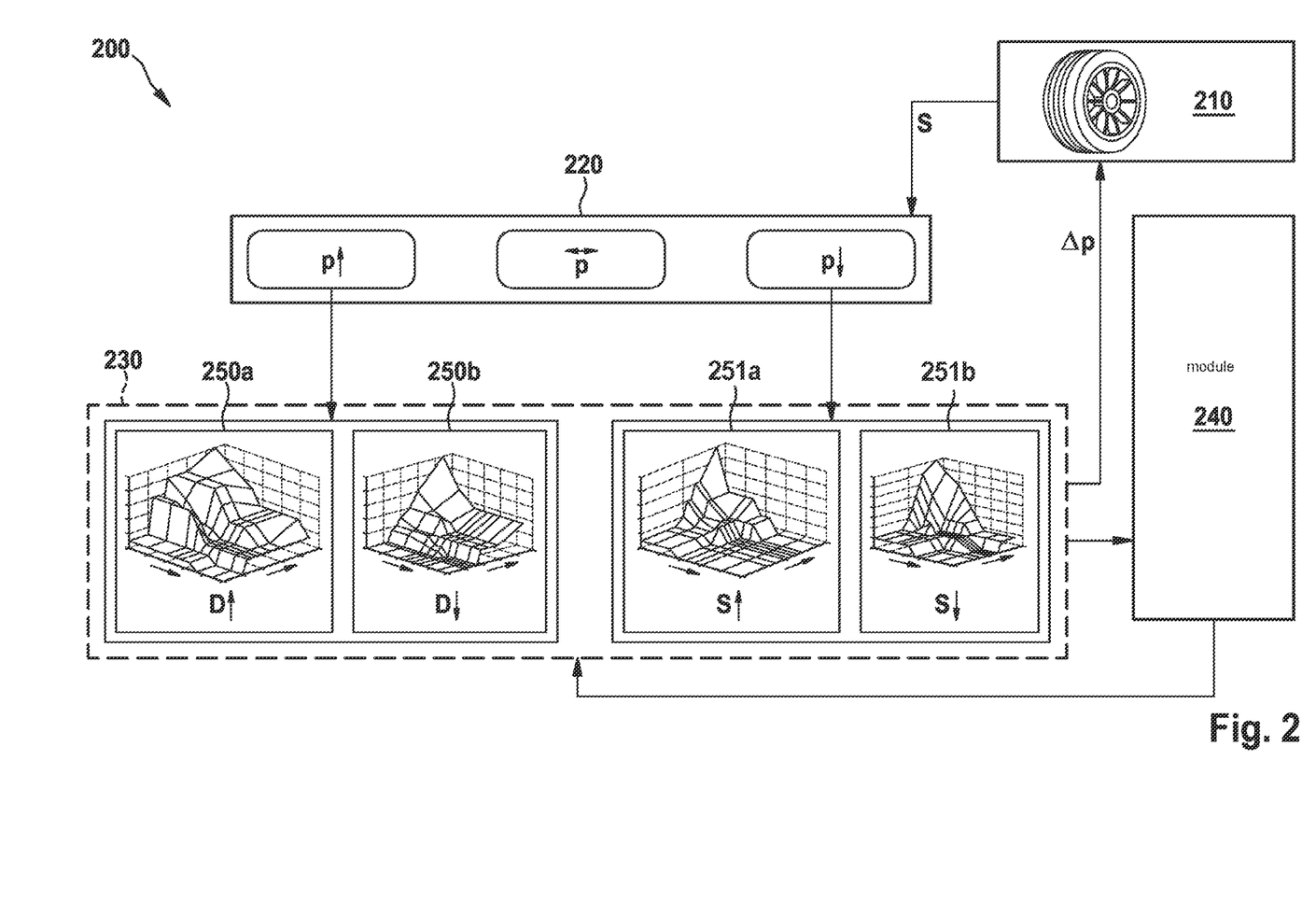
FIG. 2 shows a braking system.

FIG. 2 shows a braking system 200 configured to carry out the method for determining the brake pressure change in order to optimize a braking operation.

By way of wheel sensors and other vehicle sensors, a current wheel status 210 of the wheel is supplied, the wheel status 210 including a plurality of status parameters, for example slip s and wheel acceleration a. In the module 220 of the braking system 200, at least one status parameter whose value deviates from a target wheel status is determined, and a change direction of the brake pressure change is determined depending on a deviation of the at least one status parameter from the target wheel status. Alternatively, the brake pressure can also be kept constant.

Using this determined change direction p↑ or p↓, a supplied brake pressure characteristic map 250a, 250b, 251a, 251b for determining a value of the brake pressure change is selected, the brake pressure characteristic map associating a brake pressure change with the plurality of status parameters slip s, wheel acceleration a, or D for the braking, and being specific to the determined change direction of the brake pressure change and status parameter change. In other words, the brake pressure characteristic maps are picked depending on the direction of the change in the status parameters. There is thus a brake pressure characteristic map 250b that is specific to an increase in the wheel acceleration, and a brake pressure characteristic map 250a that is specific to a decrease in the wheel acceleration. The same applies to the slip status parameter: there is a brake pressure characteristic map 251a for an increase in the slip and a brake pressure characteristic map 251b for a decrease in the slip. In this case, the brake pressure characteristic maps 250a, 250b are associated with the positive brake pressure change, and the brake pressure characteristic maps 251a, 251b are associated with the negative brake pressure change. The value of the brake pressure change Dp can thus be determined using the current wheel status and the corresponding supplied brake pressure characteristic map, and in particular it can be forwarded to the braking system for the wheel. The values of the status parameters and of the pressure changes are forwarded to the module 240 so that the corresponding brake pressure characteristic maps can be modified using the above-described reinforcement learning method.

Figure 3:
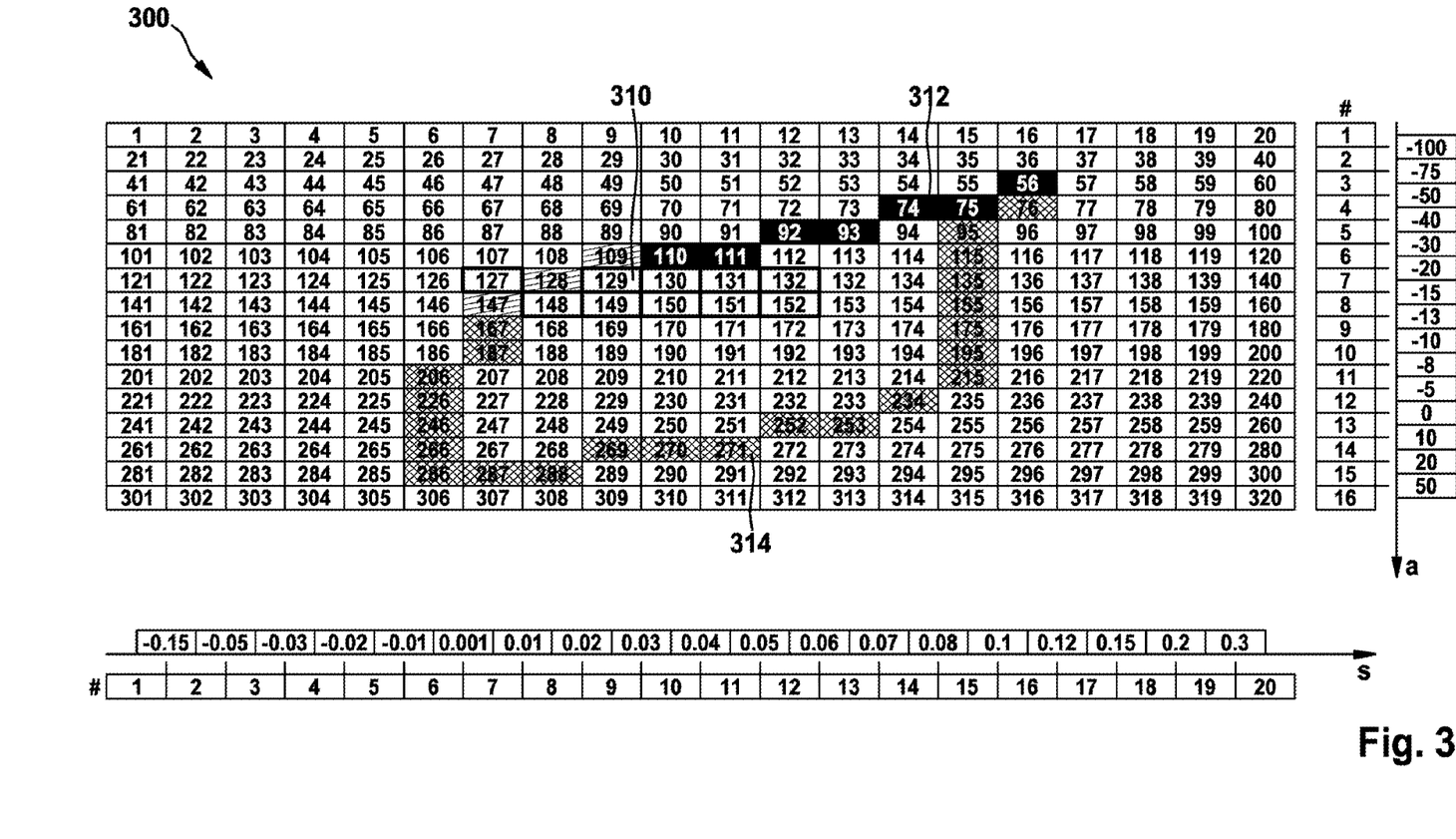
FIG. 3 is a status chart showing a progression of status values.

FIG. 3 is a schematic chart 300 showing a multiplicity of combinations of two status parameters slip s and wheel acceleration a, indicating a progression of status values. In this case, the target wheel status 310 for the status fields is highlighted by a thick border. If the method starts at a wheel status arranged in the top right in this chart 300, then a progression of status fields in which, in each case, the relevant status is determined within a set period of time of, for example, 5 ms can be denoted by way of the double-hatched fields 314; in this case, a positive brake pressure change is carried out without directly achieving the target wheel status 310, in particular owing to a delay time of, for example, 30 ms. The fields 310 highlighted in black denote status fields in which a negative brake pressure change occurs.

Brake pressure changes affect the change in the wheel status in the chart 300 as follows:

|  | Slip (x axis) | aWheel (y axis) |
| --- | --- | --- |
| Pressure build-up | greater | smaller |
| Pressure build-up | smaller | greater |

Figure 4:
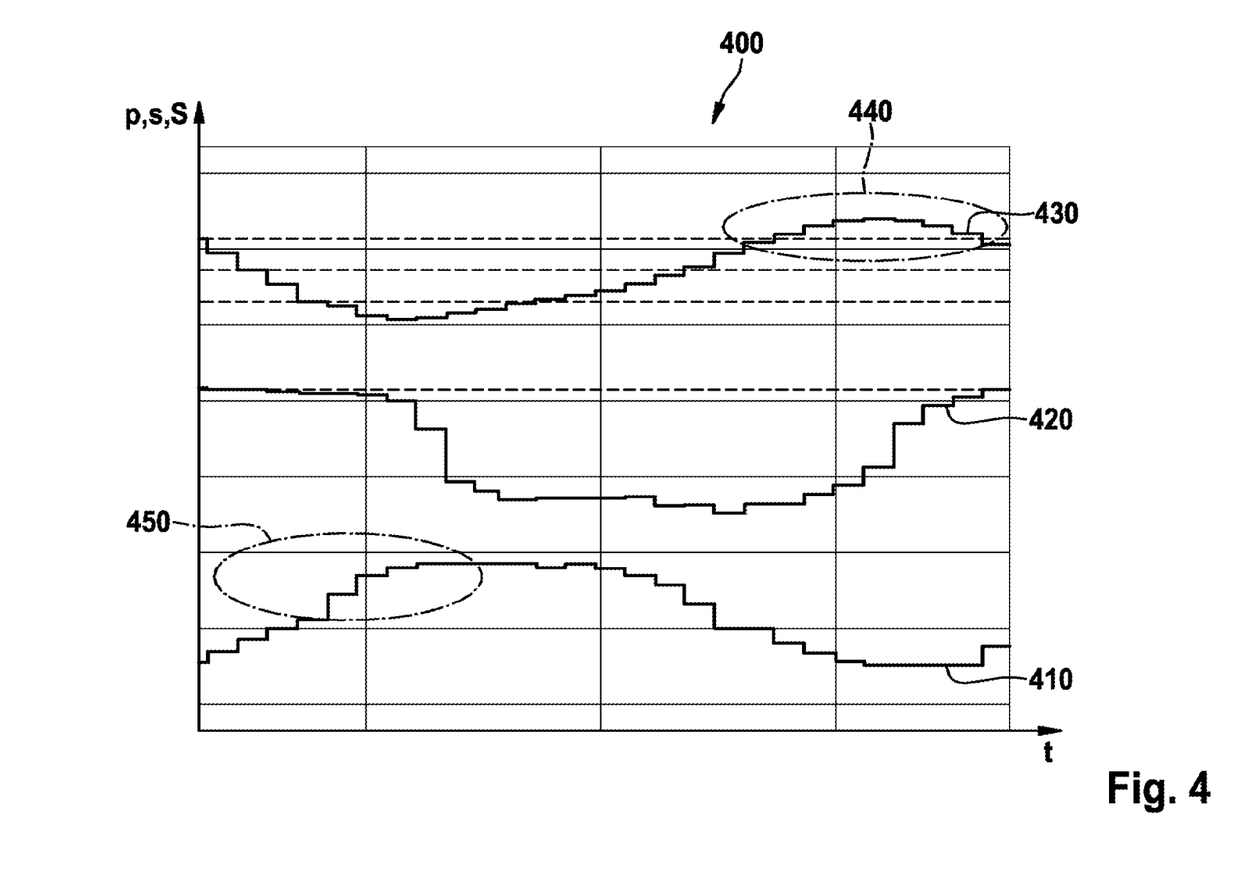
FIG. 4 is a graph showing status parameters.

FIG. 4 is a schematic graph 400 showing a progression of slip s values 430 over time, which by way of example, are located outside an upper and a lower limit value in the region 440. In this case, the curve 420 indicates the associated status value S, and the curve 410 shows a variation of the resultant brake pressure p in line with the cumulative brake pressure changes. A region 450 is indicated, and the brake pressure changes therein prior to the time frame in the region 440 can be deemed to be the reason why the slip value 430 exceeds the limit in the region 440. Using reinforcement learning, therefore, the corresponding brake pressure characteristic map for the status 420 can be adjusted to achieve a control in which the slip remains within established limits.

Figure 5:
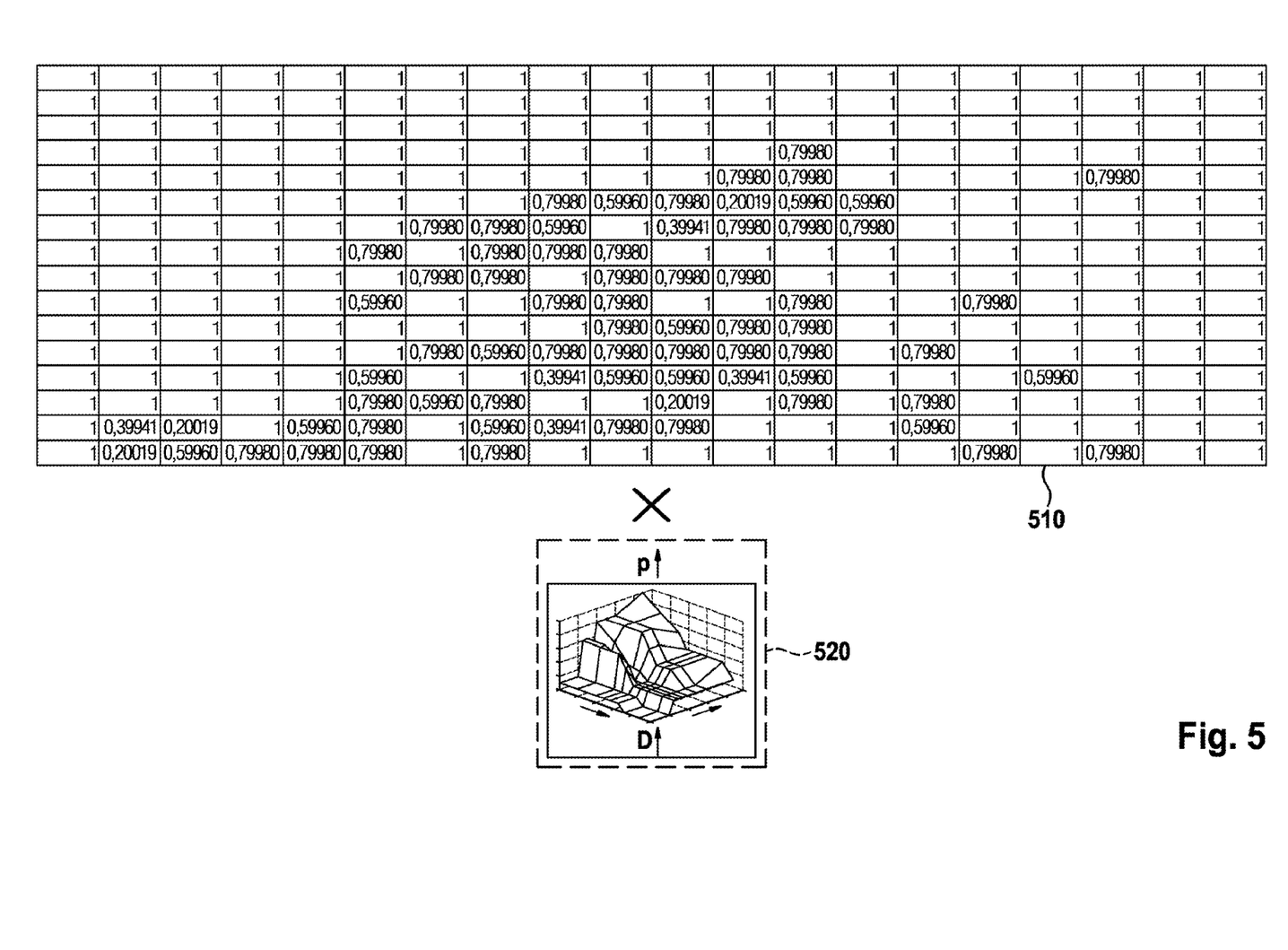
FIG. 5 shows a characteristic map comprising a matrix for changing the values of the characteristic map.

FIG. 5 shows a characteristic map 520 for an increasing pressure change, in which the status parameter for an acceleration of the wheel is decreasing, or braking is increasing.

Figure 6:
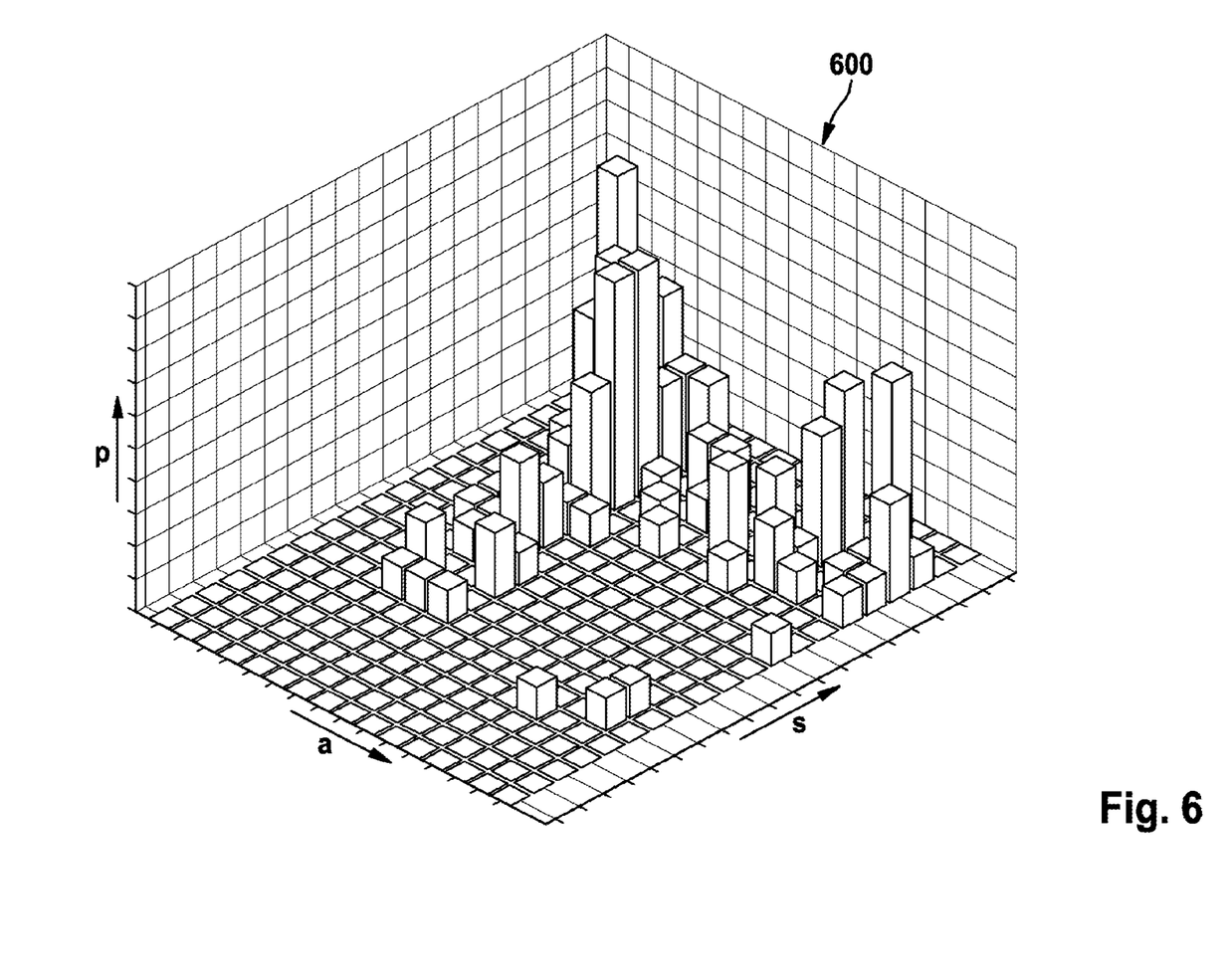
FIG. 6 is an illustration of changed characteristic map values.

FIG. 6 is an illustration of changed characteristic map values that indicate, on the basis of the status parameters wheel acceleration a and slip s, how the brake pressure p is to be changed depending on the status parameters.

Figure 7:
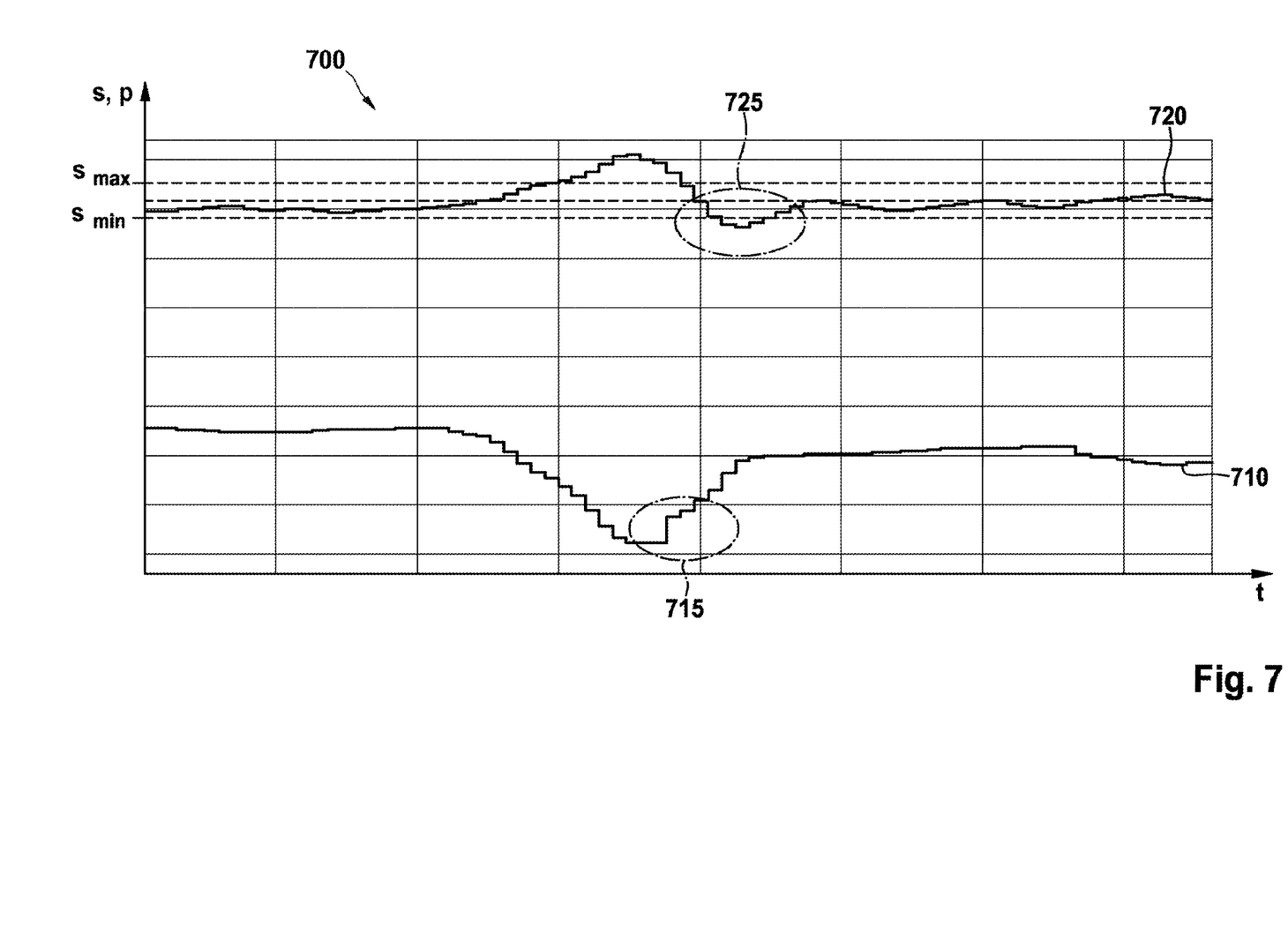
FIG. 7 is a graph showing a status parameter over time.

FIG. 7 is a graph 700 showing the slip s status parameter 720 over time; it can be seen that the slip s is below an established minimum slip value in the region 725. In addition, this graph 700 shows the variation 715 of the brake pressure p over time. The reinforcement learning method can identify this most recently completed brake pressure change and modify the associated brake pressure characteristic map accordingly, so as to prevent the slip from dropping below the limit for the corresponding wheel status in future.

Figure 8:
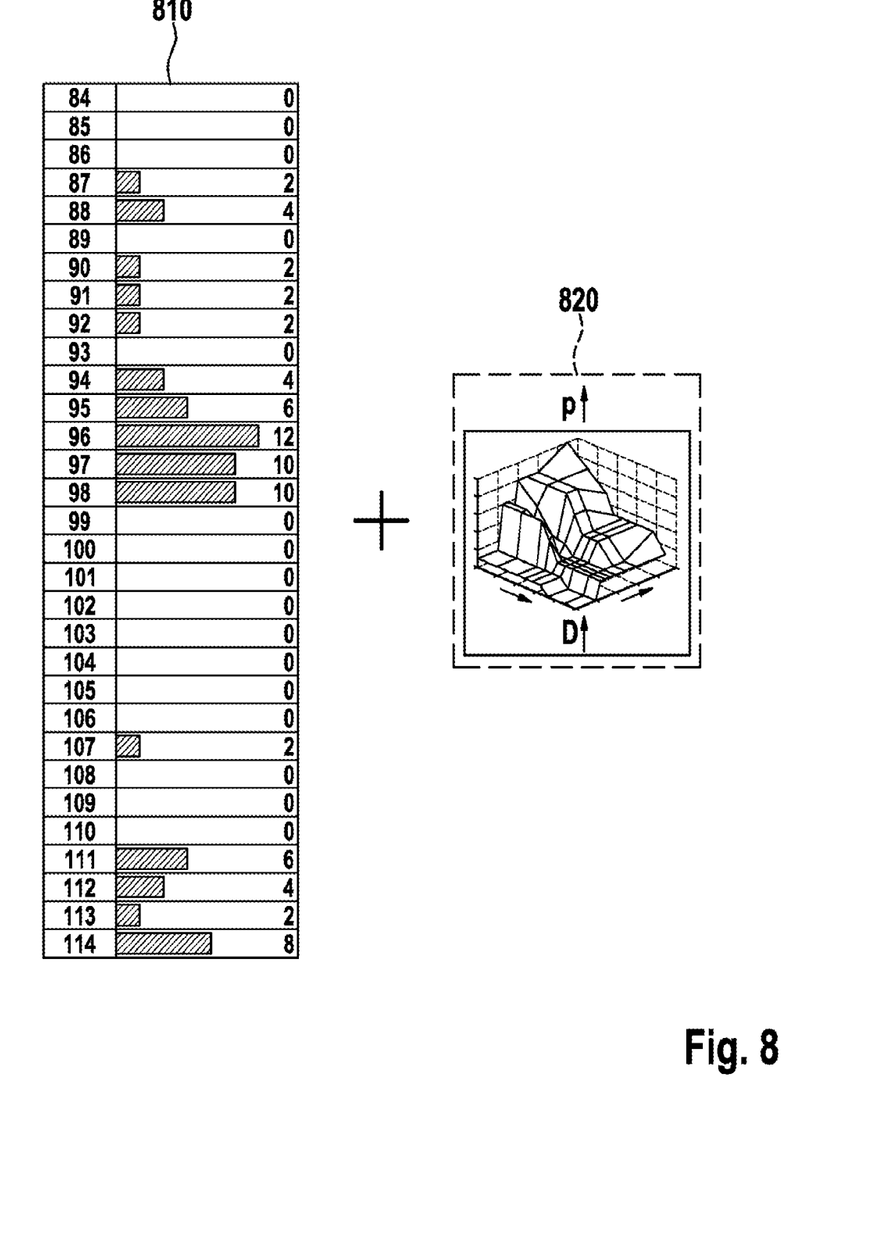
FIG. 8 shows a characteristic map comprising a list for changing the values of the characteristic map.

FIG. 8 shows a characteristic map associated with a positive brake pressure change in the event of a decreasing wheel acceleration or increasing braking; it is updated depending on the wheel status by way of a list for changing the values of the characteristic map, the list having been determined using the reinforcement learning method.

Figure 9:
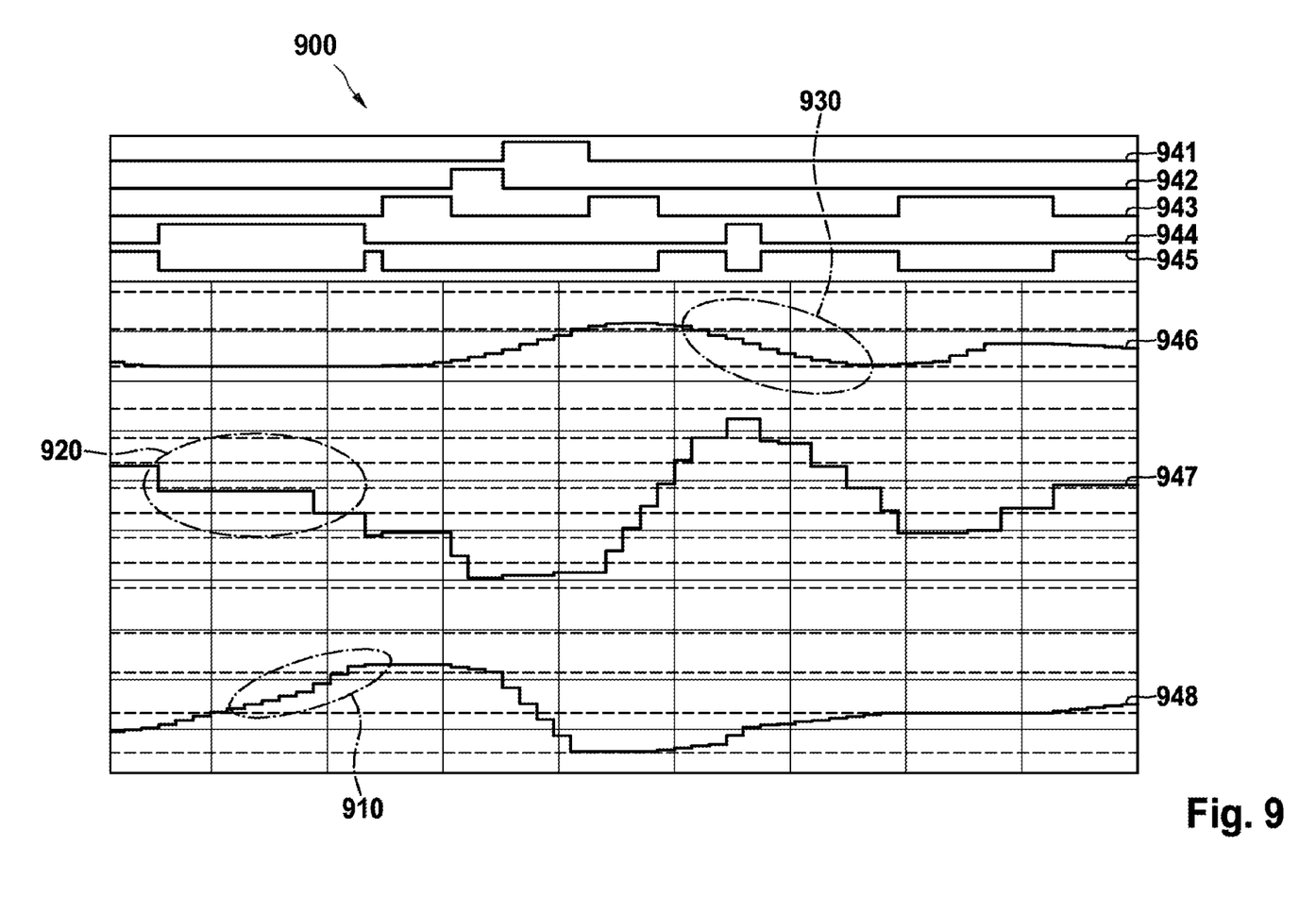
FIG. 9 is a graph showing a multiplicity of status parameters over time.

FIG. 9 is a graph showing a multiplicity of parameters and status parameters over time: slip 946, quick pressure increase 944, slow pressure increase 945, pressure kept constant 943, quick pressure drop 941, slow pressure drop 942, status index 947, target brake pressure 948. In the region 930, which denotes a quick succession of slip changes, said change can be attributed to target brake pressure changes prior thereto in the curve 948 together with the wheel status denoted in the region 920.

Since a high frequency of changes in the slip should be avoided, a modulation frequency of the pressure change can be integrated in the reward rules of the reinforcement learning method.

What is claimed is:

1. A method for determining a brake pressure change for a brake pressure applied to a wheel of a vehicle in order to optimize a braking operation, the method comprising the following steps:
   obtaining a current wheel status of the wheel, wherein the wheel status includes a plurality of status parameters;
   determining that the obtained current status of the wheel deviates, with respect to a respective value of at least one of the status parameters, from a target wheel status;
   determining a change direction of the brake pressure change depending on the determined deviation;
   selecting one of a plurality of brake pressure characteristic maps according to a selection determination of which of the plurality of brake pressure characteristic maps is to be selected, the selection determination being made dependent on the determined change direction of the brake pressure change, wherein each of the brake pressure characteristic maps associates respective values for the brake pressure change with respective states of the wheel status; and
   selecting whichever one of the respective values for the brake pressure change that the selected brake pressure characteristic map associates with the state of the current wheel status;
   wherein the method further comprises at least one of the following:
      controlling the brake pressure applied to the wheel depending on the selected value for the brake pressure change; and
      supplying a control signal for actuating an at least partially automated vehicle operation based on the determined direction and value for the brake pressure change, and/or supplying a warning signal for alerting a vehicle occupant based on the determined direction and value for the brake pressure change.

2. The method as recited in claim 1, wherein selection determination is made dependent on a change direction of the at least one status parameter whose value deviates from a target wheel status.

3. The method as recited in claim 2, wherein:
   a gradient of the at least one status parameter is determined using at least a previous wheel status and a current value of the status parameter; and
   the determination of the change direction of the brake pressure change is made additionally based on the gradient.

4. The method as recited in claim 1, wherein the determination of the change direction of the brake pressure change is determined by way of a multiplicity of the status parameters.

5. The method as recited in claim 1, wherein the determination of the change direction of the brake pressure change is determined depending on a delay time of an entire system for changing the brake pressure.

6. The method as recited in claim 1, wherein the at least one status parameter is determined from the plurality of status parameters in accordance with a prioritization order.

7. The method as recited in claim 1, wherein the plurality of status parameters includes a wheel slip and/or an acceleration of the wheel and/or a gradient of the wheel slip and/or a jerk of the wheel and/or a wheel acceleration relative to the acceleration of the vehicle.

8. The method as recited in claim 1, further comprising the controlling of the brake pressure applied to the wheel depending on the selected value for the brake pressure change.

9. The method as recited in claim 1, further comprising the supplying of the control signal for actuating the at least partially automated vehicle operation based on the determined direction and value for the brake pressure change, and/or supplying the warning signal for alerting the vehicle occupant based on the determined direction and value for the brake pressure change.

10. A method comprising the following steps:
    determining a reward using reward rules and a current wheel status, wherein the wheel status includes a plurality of status parameters; and
    based on the determination of the reward:
       determining a most recently completed brake pressure change in terms of value, change direction, and an associated brake pressure characteristic map used for the brake pressure change; and
       determining a correction value for the associated brake pressure characteristic map in accordance with the reinforcement learning method.

11. The method as recited in claim 10, wherein the reward rules define conditions for the determining of the reward, the conditions being whether a slip value drops below a limit value for the slip and/or being whether the slip value drops below zero and/or being regarding a modulation frequency of a pressure change.

12. The method as recited in claim 10, wherein the method is used for optimizing a performance of a brake pressure controller for a wheel of the vehicle.

13. The method as recited in claim 10, further comprising:
in order to optimize a braking operation, determining a brake pressure change for a wheel of a vehicle by performing the following:
obtaining a further current wheel status, the further current wheel status being of the wheel;
determining that the obtained further current status of the wheel deviates, with respect to a respective value of at least one of the status parameters, from a target wheel status;
determining a change direction of the brake pressure change depending on the determined deviation;
selecting the associated brake pressure characteristic map from a plurality of brake pressure characteristic maps according to a selection determination of which of the plurality of brake pressure characteristic maps is to be selected, the selection determination being made dependent on the determined change direction of the brake pressure change, wherein each of the brake pressure characteristic maps associates respective values for the brake pressure change with respective states of the wheel status; and
selecting whichever one of the respective values for the brake pressure change that the selected brake pressure characteristic map associates with the state of the current wheel status.

14. The method as recited in claim 13, wherein the selection determination is made dependent on a change direction of the at least one status parameter whose value deviates from the target wheel status.

15. The method as recited in claim 14, wherein:
a gradient of the at least one status parameter is determined using at least a previous wheel status and a current value of the status parameter; and
the determination of the change direction of the brake pressure change is made based additionally on the gradient.

16. The method as recited in claim 13, wherein the determination of the change direction of the brake pressure change is determined by way of a plurality of the status parameters.

17. The method as recited in claim 13, wherein the determination of the change direction of the brake pressure change is determined depending on a delay time of an entire system for changing the brake pressure.

18. The method as recited in claim 13, wherein the at least one status parameter is determined from the plurality of status parameters in accordance with a prioritization order.

19. The method as recited in claim 13, wherein the plurality of status parameters includes a wheel slip and/or an acceleration of the wheel and/or a gradient of the wheel slip and/or a jerk of the wheel and/or a wheel acceleration relative to the acceleration of the vehicle.

20. A system comprising a processor in communication with a braking system of a vehicle, wherein the processor is configured to:
determine a reward using reward rules and a current wheel status, the wheel status including a plurality of status parameters; and
based on the determination of the reward:
determine a most recently completed brake pressure change of the braking system in terms of value, change direction, and an associated brake pressure characteristic map; and
determine a correction value for the associated brake pressure characteristic map in accordance with the reinforcement learning method.

21. A non-transitory computer-readable medium on which are stored instructions that are executable by a processor and that, when executed by the processor, cause the processor to perform a method, the method comprising:
determining a reward using reward rules and a current wheel status, wherein the wheel status includes a plurality of status parameters; and
based on the determination of the reward:
determining a most recently completed brake pressure change of a braking system in terms of value, change direction, and an associated brake pressure characteristic map; and
determining a correction value for the associated brake pressure characteristic map in accordance with the reinforcement learning method.

\* \* \* \* \*